United States Patent [19]

Cavender, Jr. et al.

[11] Patent Number: 4,684,383
[45] Date of Patent: Aug. 4, 1987

[54] METHODS FOR REDUCING THE WATER CONTENT OF OPTICAL WAVEGUIDE FIBERS

[75] Inventors: Ralston R. Cavender, Jr.; Elizabeth S. Connolly, both of Wilmington, N.C.; Dale R. Powers, Painted Post, N.Y.; John E. Ritter, Wilmington, N.C.

[73] Assignee: Corning Glass Works, Corning, N.Y.

[21] Appl. No.: 824,137

[22] Filed: Jan. 30, 1986

[51] Int. Cl.⁴ .......................................... C03B 37/018
[52] U.S. Cl. .......................................... 65/3.12; 65/2; 65/13; 65/18.2
[58] Field of Search .................... 65/2, 3, 12, 18.2, 32, 65/13

[56] References Cited

U.S. PATENT DOCUMENTS

| 3,868,170 | 2/1975 | DeLuca | 65/3.12 X |
| 4,125,388 | 11/1978 | Powers | 65/3.12 |
| 4,453,961 | 6/1984 | Berkey | 65/32 X |

Primary Examiner—Robert L. Lindsay
Attorney, Agent, or Firm—W. S. Zebrowski; M. M. Klee

[57] ABSTRACT

Methods are provided for reducing the water content of optical waveguide fibers produced from blanks having a centerline aperture and having compositions which prevent cooling of the blank to room temperature between consolidation and drawing. In accordance with certain aspects of the invention, the water content is reduced by storing the blanks at as low a temperature as possible, preferably below about 550° C. In accordance with other aspects, the water content is reduced by filling the apertures of the blanks with an inert atmosphere during storage.

2 Claims, 3 Drawing Figures

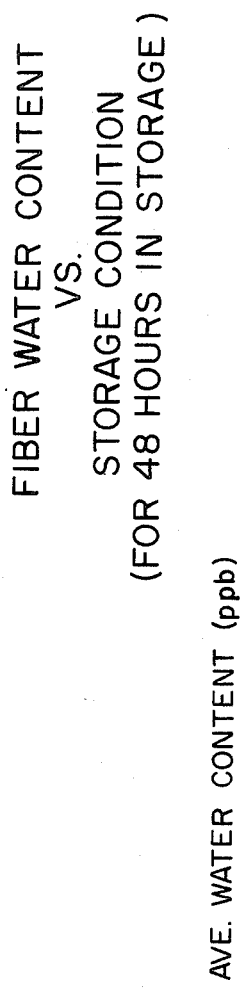

METHODS FOR REDUCING THE WATER CONTENT OF OPTICAL WAVEGUIDE FIBERS

BACKGROUND OF THE INVENTION

1. Field of the Invention

This invention relates to optical waveguide fibers and, in particular, to methods for reducing the water content of such fibers.

2. Description of the Prior Art

As is known in the art, the water or OH⁻ content of an optical waveguide fiber is one of the important parameters which determines a fiber's attenuation coefficient. Extensive efforts have gone into reducing fiber water levels so that today, fibers are expected to have water levels in the parts per billion range, whereas ten years ago, a level in the parts per million range was considered a significant achievement.

Although it is desirable to have a low water content throughout the fiber, it is especially desirable to have a low water content along the centerline of the fiber. This is particularly critical in the case of single mode fibers since for these types of fibers, the maximum field strength of the optical signal occurs at the centerline of the fiber and is concentrated in a small area.

Some of the techniques known in the art for reducing the water content of optical waveguide fibers are exemplified by U.S. Pat. No. 3,868,170 to Robert D. DeLuca and by U.S. Pat. No. 4,453,961 to George E. Berkey. The DeLuca patent describes depositing glass soot on a starting member to form a porous body, placing the body in a controlled environment having a water content of less than 20 parts per million, heating the body to a preselected temperature below the sintering temperature of the glass (e.g., 1,200° C.), maintaining the body at the preselected temperature for a period of time sufficient for an equilibrium to be reached between the partial pressure of water in the body and the partial pressure of water in the controlled environment, sintering the body, and removing the starting member to form a consolidated tubular member which can be drawn into an optical waveguide fiber. Removal of the starting member can be performed either within or outside of the controlled environment. Similarly, the tubular member can be drawn into a fiber either within the controlled environment or in air.

The Berkey patent describes a method for preventing contamination of a glass blank, also referred to as a consolidated preform, having an aperture along its centerline. In accordance with this patent, the blank is formed by (1) applying particulate glass (soot) to the outside surface of an elongated mandrel; (2) removing the mandrel to form a porous preform having a longitudinal aperture down its centerline; and (3) drying and consolidating the porous preform following the procedures of U.S. Pat. No. 4,125,388 by surrounding the preform with a drying gas (e.g., 5% chlorine, 95% helium), passing drying gas through the preform's aperture, and heating the preform to a temperature above its sintering temperature. Once formed, the blank is sealed by closing one end of the aperture, evacuating the aperture, and then closing the other end of the aperture. In this way, the blank can be stored and subjected to further processing, including drawing, without fear of water or other contaminants entering the glass through the walls of the aperture.

In addition to the foregoing, U.S. Pat. No. 3,037,241 to Bazinet, Jr., et al, describes a rod-in-a-tube process for producing optical waveguide fibers wherein a vacuum is applied to the tube during drawing to remove air and gases from the space between the rod and the tube.

Although the process of the Berkey patent, supra, works successfully and can be used to produce optical waveguide fibers having a water content of less than 100 parts per billion (ppb), the blank sealing procedure of this patent adds a number of additional steps, and thus additional cost, to the overall waveguide production process. Also, fairly extensive training has been found necessary for workers to perform the sealing process successfully.

Accordingly, rather than sealing the blank after consolidation, an alternate procedure has been adopted wherein the blank is simply stored at room temperature with its ends open and a vacuum is applied to the aperture at the time of draw. It has been found that this procedure works successfully for blanks which can be stored at room temperature.

However, not all blanks can be stored at room temperature. Specifically, in order to achieve improved optical properties, blanks have been designed having chemical compositions which result in differences in expansion coefficients between different regions of the blank which are too great to allow the blank to be cooled to room temperature without fracturing.

For example, U.S. patent application Ser. No. 496,560, to V. A. Bhagavatula, which was filed on May 20, 1983 and which is entitled "Low Dispersion, Low-Loss Single-Mode Optical Waveguide," describes single mode optical waveguide fibers having refractive index profiles which result in improved dispersion and loss properties. Blanks suitable for making these fibers have thermal coefficients of expansion whose differences from region to region are on the order of $7 \times 10^{-7}$ cm/cm°C. Such blanks cannot be stored at room temperature without a substantial risk of fracture, e.g., approximately 75% of the blanks break, but rather must be stored at an elevated temperature.

When blanks of this type were stored with their ends open, as had been done with the blanks which could be stored at room temperature, it was surprisingly found that the water content of the finished fibers increased to unacceptable levels, e.g., to more than 100 ppb. This was found to be the case even though the same level of vacuum during drawing was used as had been used with the fibers which could be stored at room temperature. It was this problem of excessively high water levels for blanks requiring high temperature storage which led to the present invention.

SUMMARY OF THE INVENTION

In view of the foregoing state of the art, it is an object of this invention to provide methods for reducing the water content of fibers prepared from blanks which cannot be cooled to room temperature because of differences in the thermal coefficients of different parts of the blank. It is a further object of the present invention to provide methods of the foregoing type which can be conveniently incorporated into existing processes for producing optical waveguide fibers. More particularly, it is an object of the invention to provide methods for reducing water content which do not involve sealing the ends of the blank.

To achieve the foregoing and other objects, the present invention provides a method for reducing the water content of an optical waveguide fiber formed by drawing a glass blank, said glass blank having (1) an aperture therethrough, (2) being formed at an elevated temperature, and (3) including regions having thermal coefficients of expansion which are sufficiently different so as to cause the blank to have a relatively high probability of fracture if cooled to room temperature, the method comprising the steps of:

(a) cooling the blank from the elevated temperature to a temperature within a preselected temperature range, said range being the lowest temperatures at which the blank has a relatively low probability of fracture;

(b) maintaining the temperature of the blank within the preselected temperature range until drawing is to be performed; and (c) drawing the blank while applying a vacuum to the aperture.

As described in detail below, it has been found that careful selection of the blank storage temperature in combination with the use of a vacuum during drawing will successfully control both blank breakage and the water content of the finished fiber. In general, to accommodate storage periods of up to 48 hours and to achieve a water content of less than 100 ppb for the finished fiber, it has been found that the storage temperature has to be less than approximately 550° C.

For some blank compositions, breakage considerations require a storage temperature above this value. For blanks of this type, an alternate method for reducing water content has been developed. Specifically, in accordance with this aspect of the invention, a method is provided for reducing the water content of an optical waveguide fiber formed by drawing a glass blank, said glass blank having an aperture therethrough and including regions whose thermal coefficients of expansion are sufficiently different such that the blank has a relatively high probability of fracture if cooled to room temperature, comprising the steps of:

(a) filling the aperture with an atmosphere comprising an inert gas and having a low water content;

(b) maintaining the atmosphere within the aperture until the blank is to be drawn, while holding the temperature of the blank within a preselected temperature range in which the blank's probability of fracture is relatively low; and (c) drawing the blank while applying a vacuum to the aperture.

The attainment of the foregoing and other objects and advantages of the present invention is described fully below in connection with the description of the preferred embodiments of the invention.

BRIEF DESCRIPTION OF THE DRAWINGS

FIG. 3 is a bar graph of the experimentally measured water concentrations of fibers produced from blanks stored for 48 hours under the following conditions: first bar—storage at 630° C. in air; second bar—storage at 300° C. in air; third bar—storage at 630° C. in a storage oven being purged with nitrogen at a rate of 4 standard liters/minute; fourth bar—storage at 630° C. while purging the blank's aperture with nitrogen at a rate of 2 standard liters/minute; fifth bar—storage at 630° C. while applying a vacuum to the blank's aperture. The numbers under the bars represent the number of blanks tested.

DESCRIPTION OF THE PREFERRED EMBODIMENTS

Figure 1:
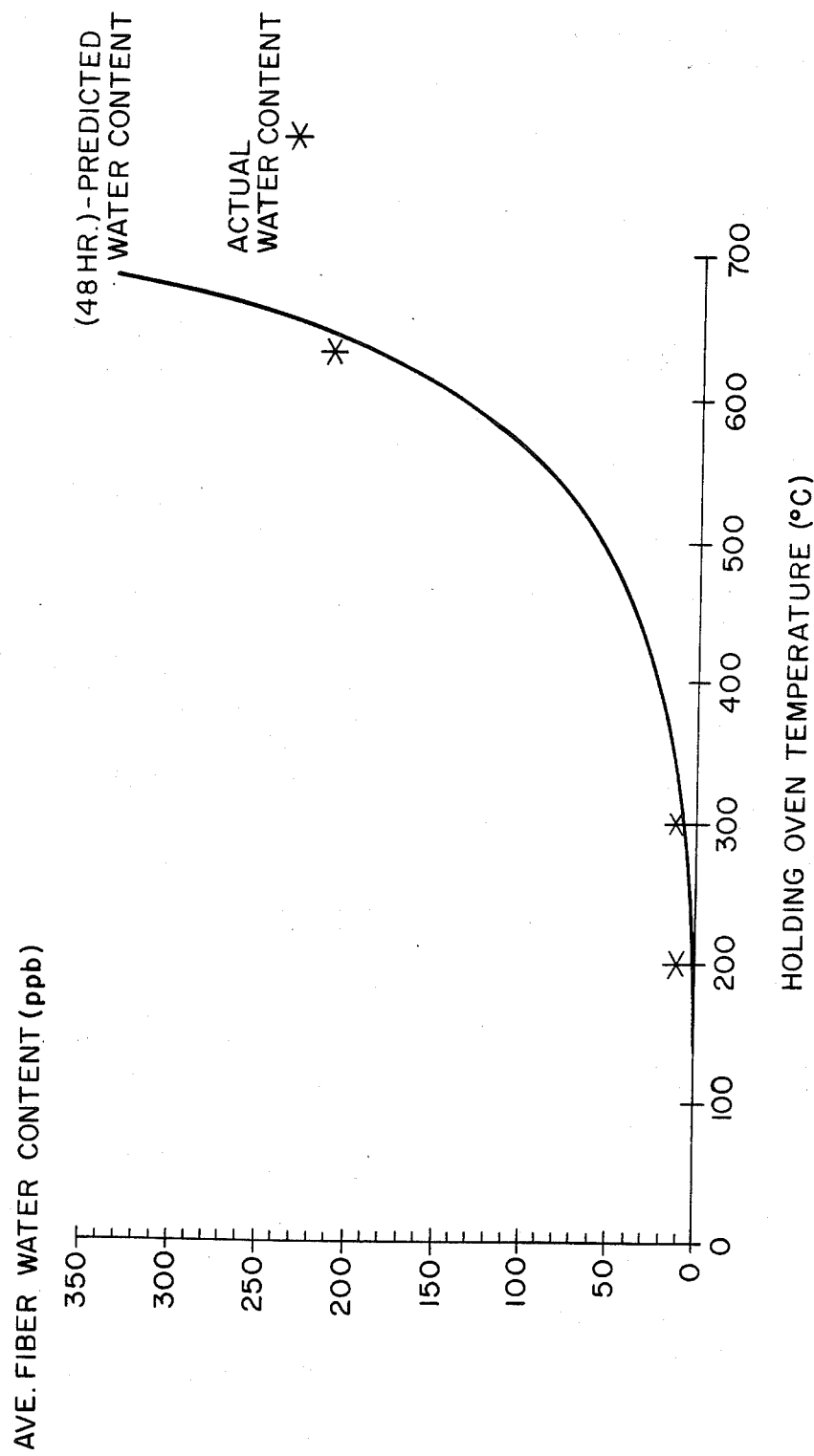
FIG. 1 is a graph of the calculated water concentration of finished fibers produced from blanks stored for 48 hours as a function of holding oven temperature. The figure also shows the experimental results obtained for three sets of blanks stored at 200° C. (25 hour storage), 300° C. (48 hour storage) and 630° C. (48 hour storage).

As described above, the present invention relates to methods for reducing the water content of optical waveguide fibers formed from blanks having compositions which prevent the blank from being stored at room temperature. For commercial operations, it is important to be able to store blanks, at least temporarily, so that equipment utilization within the waveguide manufacturing plant can be optimized and so that different rates of blank production and drawing for different processes and blank compositions can be accommodated.

The methods of the present invention are applicable to all types of blanks having the foregoing thermal properties, irrespective of the specific chemical composition which is the source of the thermal coefficient mismatch between different regions of the blank and irrespective of the particular process used to create the blank. The methods of the invention are particularly suitable for use with blanks having compositions of the type described in U.S. patent application Ser. No. 496,560, referred to above, the pertinent portions of which are incorporated herein by reference.

Similarly, the methods of the invention are particularly suitable for use with outside vapor deposition (OVD) processes of the type described in the Berkey patent, referred to above, and further described in U.S. Pat. No. 4,486,212 and in the various patents referred to in those patents, the pertinent portions of all of which are also incorporated herein by reference.

As described in these references, in an OVD process, a glass blank having an aperture along its centerline is formed by consolidating a soot preform at an elevated temperature, e.g., on the order of 1400° C. When practiced commercially, after the blank is formed, it is typically stored for a variable period of time of up to about 48 hours as a function of equipment availability, plant schedules, work load, etc. Thereafter, depending upon the particular fiber to be produced, the blank can either be drawn directly into the finished fiber or can be drawn into an intermediate fiber (cane) which is subjected to further processing and then redrawn into the finished fiber.

During storage, water enters a blank both through its outer surface and through the surface of its centerline aperture. In comparison to the water entering through the centerline aperture, the water entering through the outer surface is generally unimportant since for most blanks this outer surface becomes part of the fiber's cladding, rather than part of the fiber's core. The water entering through the centerline aperture, on the other hand, can be extremely detrimental to the optical performance of the fiber, especially for single mode fibers, since this water ends up along the centerline of the finished fiber.

In accordance with the invention, it has been determined that the total water which has entered a blank through the centerline aperture during storage must be considered as being made up of two components which interact with each other and which must be controlled separately to achieve a low water content for the finished fiber. The two components are: (1) a surface component at and just under the interface between the glass and the atmosphere filling the blank's aperture; and (2) a deep component comprising water which has left the surface component and has diffused into the body of the blank.

The water in the surface component consists of the water in the blank which is in equilibrium with the water in the aperture's atmosphere. Accordingly, the water concentration in this region is a function of only two variables: (1) the water solubility of the glass at the surface of the aperture; and (2) the partial pressure of water in the aperture's atmosphere. Water solubility, in turn, is a function of the temperature of the blank. In general, water solubility decreases with increasing temperature. See A. J. Moulson and J. P. Roberts, "Water in Silica Glass," *Trans. Brit. Ceramic Soc.*, Vol. 59, pages 388-399, (1960).

The water in the deep component, on the other hand, is not in equilibrium with the water in the aperture's atmosphere. Rather, its concentration depends on: (1) the water concentration in the region of the surface component; (2) the diffusion coefficient for water through the blank; and (3) the amount of time the water has had to diffuse either into or out of the blank. As with solubility, the diffusion coefficient is a function of the temperature of the blank. However, rather than decreasing with increasing temperature, the diffusion coefficient increases with increasing temperature. See A. J. Moulson and J. P. Roberts, supra.

As described in detail below, in accordance with the invention, it has been found that:

(1) The amount of surface water accumulated by the blank during storage is not a critical variable which must be controlled during storage since surface water can be removed from the blank at the time of drawing by applying a vacuum to the blank's aperture. Accordingly, blanks can be stored at low temperatures even though such storage increases the solubility of the blank and thus increases the amount of surface water accumulated in the blank.

(2) The amount of deep water accumulated by the blank during storage is the critical variable which must be controlled during storage. Applying a vacuum to the blank's aperture for a commercially reasonable period of time, e.g., 10 minutes, will not remove large amounts of deep water which have extended far into the blank even at the elevated temperatures involved in drawing.

(3) Of the two temperature sensitive variables which determine the amount of deep water accumulated during storage, i.e., water solubility, which determines the concentration of water in the surface component, and water diffusion coefficient, which determines the rate at which water diffuses into the body of the blank from the surface component, the diffusion coefficient turns out to be the most important variable. That is, in order to reduce deep water accumulation, it has been found that it is more important to have a small diffusion coefficient than it is to have a low surface water concentration. More particularly, it has been found that the net effect of a low storage temperature, which, on one hand, increases surface water by increasing solubility, but on the other hand, reduces the water diffusion coefficient, is to reduce the amount of deep water and thus the water content of the finished fiber.

In view of these findings, one of the methods of the present invention for reducing the water content of finished fibers is as follows:

(1) As soon as possible after consolidation, the blank is cooled to a temperature within a preselected temperature range. Cooling of the blank is accomplished most simply by placing the blank in a holding oven set at the desired temperature. The preselected temperature range comprises the lowest temperatures at which the blank has a relatively low probability of fracture. For example, for a blank having a thermal coefficient mismatch on the order of $7 \times 10^{-7}$ cm/cm°C., a temperature range of from approximately 300° C. to approximately 550° C. has been found to result in essentially 0% fractures and a water content of the finished fiber of less than 100 ppb.

(2) The temperature of the blank is maintained within the preselected temperature range until drawing is to be performed. Preferably, the storage time is kept as short as possible since deep water accumulation increases with time, the total accumulation being approximately proportional to the square root of the storage time. See J. Crank, The Mathematics of Diffusion, Oxford University Press, London, England, 1956, pages 30-31.

(3) When drawing is to be performed, a vacuum is applied to the blank's aperture in order to strip surface water and as much deep water as possible from the blank. More particularly, a vacuum is applied to the blank's aperture as the blank is being heated and drawn into a final or intermediate fiber in the drawing furnace. The combination of the vacuum, which produces an atmosphere in the blank's aperture having a very low water content, and the heating of the blank, which decreases water solubility and increases diffusion coefficient, leads to a rapid decrease in the total amount of water, both surface and deep, within the blank. If the water level prior to drawing has been controlled by means of steps (1) and (2), it has been found that for an applied vacuum of approximately 800-1000 millitorr and for a typical commercial drawing process employing a draw temperature of approximately 2100° C. and a blank feed rate of approximately 0.45 cm/sec, sufficient water can be removed from the blank prior to aperture closure so as to produce a finished fiber having a water level of less than 100 ppb.

The findings upon which the foregoing method is based were obtained from the following experimental studies and theoretical analysis.

On the theory side, the blank's aperture was modeled as a semi-infinite medium, $x > 0$, having a constant water concentration at its boundary. During storage, the constant water concentration at the boundary was calculated from the solubility versus temperature values reported in Moulson and Roberts, supra. Specifically, the solubility S was assumed to vary exponentially with temperature in accordance with the expression:

$$S = A \exp (B/RT)$$

and the constants A and B were evaluated using the solubility values of $6 \times 10^{-3}$ and $3 \times 10^{-3}$ hydroxyl groups per $SiO_2$ molecule at 600° C. and 1200° C., respectively, reported in Moulson and Roberts. During vacuum stripping, the boundary water concentration was assumed to be zero.

The movements of water into and out of the blank during storage and stripping were calculated from the one dimensional diffusion equation:

$$\partial C(x,t)/\partial t = D \; \partial^2 C(x,t)/\partial x^2 \qquad (1)$$

where $C(x,t)$ is the water concentration at position x and time t, and where D is the temperature dependent diffusion coefficient for water within the blank.

Equation 1 was solved numerically using standard numerical analysis techniques. At the beginning of storage, it was assumed that the water concentration throughout the blank was zero. At the beginning of stripping, it was assumed that the water distribution in the blank was the same as the water distribution calculated to exist at the end of storage. Diffusion coefficients for the various storage and stripping temperatures were calculated from the following equation reported in Moulson and Roberts, supra:

$$D = 1 \times 10^{-6} \exp(-18{,}300/RT) \; cm^2/sec$$

where R is the gas constant, 1.987 cal. mole$^{-1}$ °C.$^{-1}$, and T is the absolute temperature in degrees Kelvin.

From the calculated water distributions, an average water content in ppb for the core portion of the blank was calculated by summing the calculated water concentrations, multiplying that sum by both the grid spacing used in the numerical analysis technique and by the circumference of the blank's aperture, and dividing by the cross-sectional area of the core portion of the blank.

Since the physical act of stretching the blank into a fiber does not change the average water content of the fiber, the average water content calculated for the core portion of the blank is also the average water content for the core of the finished fiber. To facilitate comparison between the theoretical calculations and the experimental measurements, which involved measuring the attenuation of finished single mode fibers at 1390 nm and converting the measured values into average water concentrations by means of the known relation that 1 db/km of attenuation corresponds to approximately 30 ppb of water, the theoretical values were multiplied by 1.2 to take account of the fact that the highest water concentrations occur in the region of the centerline of the finished fiber where, for single mode fibers, the light intensity is greatest.

By means of the foregoing procedures, the average water content of fibers produced from blanks stored at storage temperatures ranging from 200° C. to 800° C. and for storage periods of up to 48 hours were calculated. The blank was assumed to have been stored in air having a relative humidity at 27° C. of 50%, and was assumed to have an aperture diameter of 0.25 cm and a core diameter of 2.1 cm. It was further assumed that as part of the drawing process, the blank was subjected to vacuum stripping at 1800° C. for 10 minutes prior to aperture closure.

The results of these calculations are shown in Table 1 where the upper number for each time/temperature combination represents the calculated average water concentration after storage and before vacuum stripping, and the lower number represents the calculated residual water in the finished fiber after vacuum stripping. As shown in the table, the desired low residual water values are achieved for low storage temperatures and short storage periods.

FIG. 1 shows a plot of the 48-hour data of Table 1. As shown in this figure, a water level of less than 100 ppb is achieved only for storage temperatures less than about 550° C. FIG. 1 also shows the results of three experimental studies which were performed to test the predictive value of the theoretical model.

In these studies, fibers having a refractive index profile of the type described by V. A. Bhagavatula and R. A. Modavis in the Digest of Technical Papers, Conference on Optical Fiber Communication, Feb. 11-13, 1985, San Diego, Cal., Session WD3 (see FIG. 1) were prepared following the techniques of U.S. Pat. Nos. 4,453,961 and 4,486,212, except that after consolidation, the blanks were stored with their ends open, rather than sealed. The chemical composition of these blanks was such that there was a thermal coefficient mismatch on the order of $7 \times 10^{-7}$ cm/cm°C. between different regions of the blanks, and thus the blanks could not be cooled to room temperature without a significant probability of fracture. Specifically, the probability of fracture at room temperature was about 75%, at 200° C. it was about 50%, and only at 300° C. did it drop to about 0%.

Three blanks of the foregoing type were stored in a holding oven heated to 630° C. for 48 hours prior to drawing. Another 17 blanks were stored for the same period of time, but at a holding oven temperature of 300° C., and an additional 3 blanks were stored at a temperature of 200° C. for a period of 25 hours. The holding oven was open to the ambient air which had a relative humidity of about 40%. All 23 blanks were drawn into the cane in a standard optical waveguide draw furnace operated at about 2100° C. The blanks were fed into the furnace at a feed rate of about 0.45 cm/sec, and a vacuum of about 800-1000 millitorr was applied to the apertures of the blanks during drawing. The water content of the finished fibers was estimated by measuring the attenuation of the fibers at 1390 nm and converting the measured values to water concentrations using the 1 db/km = 30 ppb OH$^-$ relationship discussed above.

As shown in FIG. 1, the blanks stored at 600° C. produced finished fibers having an average water concentration of 211 ppb, while the blanks stored at 300° C. and 200° C. produced fibers having an average water concentration of only 12 ppb and 7 ppb, respectively. As also shown in this figure, the theoretical model and the experimental results are in good qualitative agreement.

As discussed above, for some blank compositions, the thermal mismatch between different regions of the blank is so great that it is not possible to store the blank at a temperature low enough to prevent significant accumulations of deep water. For these types of blanks, the invention provides alternate methods for reducing the water content of the finished fibers. Specifically, in accordance with these methods, the blank's aperture is filled with an inert gas, such as nitrogen, having a low water content. Such filing can be accomplished by purging just the aperture with the inert gas or by purging the whole storage oven.

Figure 2:
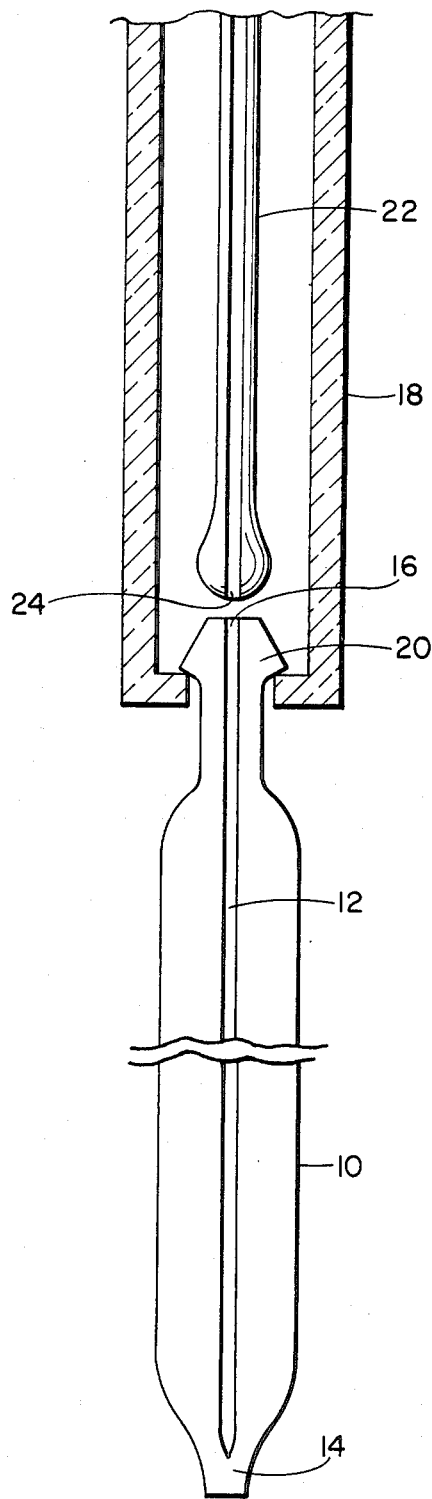
FIG. 2 is a schematic, cross-sectional view of apparatus suitable for filing the aperture of a blank with an inert atmosphere.

FIG. 2 shows suitable apparatus for purging just the aperture. Blank 10, having sealed end 14 and open end 16, is supported in frame 18 by means of integral handle 20. Inert gas is passed through tube 22 and out of orifice 24 so as to both surround open end 16 of the blank and fill aperture 12 with the gas.

Whole oven purging is accomplished by introducing inert gas into a standard storage oven using, for example, a capillary tube which is inserted through the open end of the oven and extends to the bottom of the oven.

The flow rate of gas through the capillary tube is adjusted so as to maintain an inert atmosphere throughout the oven.

FIG. 3 shows the results of a series of experiments performed to test the inert atmosphere approach. Specifically, blanks were prepared, stored, drawn, and tested for attenuation in the manner described above for the cool storage oven experiments, except that the blanks were either stored at 630° C. in a holding oven purged with nitrogen at a rate of 4 standard liters/minute or were stored at 630° C. while nitrogen was applied to the blank's aperture at a rate of 2 standard liters/minute using the apparatus of FIG. 2.

As shown in FIG. 3, the two inert gas approaches produced similar low water levels, the full oven purge producing an average water concentration for the finished fibers of 12 ppb, while the aperture purge produced an average concentration of 18 ppb. For comparison, FIG. 3 also includes the experimental data of FIG. 1, as well as the results of two experiments wherein the apparatus of FIG. 2 was used to apply a vacuum to the blank's aperture, rather than a nitrogen purge. As shown by this data, under the experimental conditions used, the cool storage oven approach produced the lowest water levels (12 ppb), followed by the nitrogen purges (12 and 18 ppb), and then the vacuum approach (23 ppb).

TABLE 1

Water Levels As a Function of Storage Time and Temperature
Upper No. - Ave. Water Content (ppb) After Storage
Lower No. - Ave. Water Content (ppb) After Vacuum Stripping

| Storage Time (hours) | Storage Temperature (°C.) | | | | | | |
|---|---|---|---|---|---|---|---|
| | 200 | 300 | 400 | 500 | 600 | 700 | 800 |
| 1.0 | 3.2 | 10.0 | 22.5 | 40.9 | 64.9 | 93.7 | 126.3 |
| | 0.0 | 0.0 | 0.3 | 1.3 | 3.9 | 9.9 | 20.6 |
| 2.0 | 4.5 | 14.2 | 31.8 | 57.8 | 91.8 | 132.5 | 178.6 |
| | 0.0 | 0.1 | 0.6 | 2.5 | 7.9 | 19.7 | 40.4 |
| 3.0 | 5.5 | 17.3 | 38.9 | 70.8 | 112.4 | 162.3 | 218.7 |
| | 0.0 | 0.1 | 0.9 | 3.8 | 12.0 | 29.4 | 59.2 |
| 5.0 | 7.1 | 22.4 | 50.2 | 91.4 | 145.1 | 209.5 | 282.4 |
| | 0.0 | 0.2 | 1.4 | 6.3 | 19.9 | 48.1 | 94.4 |
| 8.0 | 9.0 | 28.3 | 63.5 | 115.7 | 183.6 | 265.0 | 357.2 |

TABLE 1-continued

Water Levels As a Function of Storage Time and Temperature
Upper No. - Ave. Water Content (ppb) After Storage
Lower No. - Ave. Water Content (ppb) After Vacuum Stripping

| Storage Time (hours) | Storage Temperature (°C.) | | | | | | |
|---|---|---|---|---|---|---|---|
| | 200 | 300 | 400 | 500 | 600 | 700 | 800 |
| | 0.0 | 0.3 | 2.3 | 10.0 | 31.7 | 74.8 | 142.9 |
| 12.0 | 11.0 | 34.7 | 77.8 | 141.6 | 242.8 | 324.5 | 437.5 |
| | 0.0 | 0.5 | 3.4 | 15.2 | 46.9 | 108.3 | 201.7 |
| 16.0 | 12.7 | 40.0 | 89.8 | 163.6 | 259.6 | 374.7 | 505.1 |
| | 0.0 | 0.6 | 4.6 | 20.3 | 61.8 | 139.8 | 255.5 |
| 24.0 | 15.5 | 49.0 | 110.0 | 200.3 | 318.0 | 458.9 | 618.7 |
| | 0.1 | 0.9 | 6.8 | 30.4 | 90.3 | 198.4 | 352.6 |
| 36.0 | 19.0 | 60.0 | 134.7 | 245.3 | 389.4 | 562.1 | 757.7 |
| | 0.1 | 1.4 | 10.2 | 45.2 | 130.7 | 278.1 | 480.0 |
| 48.0 | 22.0 | 69.3 | 155.6 | 283.3 | 449.6 | 649.0 | 874.9 |
| | 0.1 | 1.8 | 13.7 | 59.7 | 168.7 | 350.5 | 592.5 |

What is claimed is:

1. A method for reducing the water content of an optical waveguide fiber formed by drawing a glass blank, said glass blank having (1) an aperture therethrough, (2) being formed at an elevated temperature, and (3) including regions whose thermal coefficients of expansion differ by at least about $7 \times 10^{-7}$ cm/cm°C. such that the blank's probability of fracture if cooled to room temperature is at least about 75 percent, the method comprising the steps of:
   (a) cooling the blank from the elevated temperature to a temperature within a preselected temperature range, the blank's probability of fracture within said range being below about 50 percent, the low end of said range being above room temperature and the high end of said range being below about 550° C., said range being selected to minimize the diffusion of water from the surface of the aperture into the body of the blank;
   (b) maintaining the temperature of the blank within the preselected temperature range for a period of time of up to about 48 hours until drawing is to be performed; and
   (c) drawing the blank at an elevated temperature while applying a vacuum to the aperture, the elevated temperature and the vacuum removing sufficient water from the blank prior to aperture closure so as to produce a finished fiber having a water level of less than 100 parts per billion.

2. The method of claim 1 wherein the blank's probability of fracture within the preselected temperature range is approximately zero.

* * * * *